May 30, 1972     E. CAIRNS ETAL     3,666,560
ELECTROCHEMICAL POWER-PRODUCING CELL
Filed Sept. 21, 1970     3 Sheets-Sheet 1
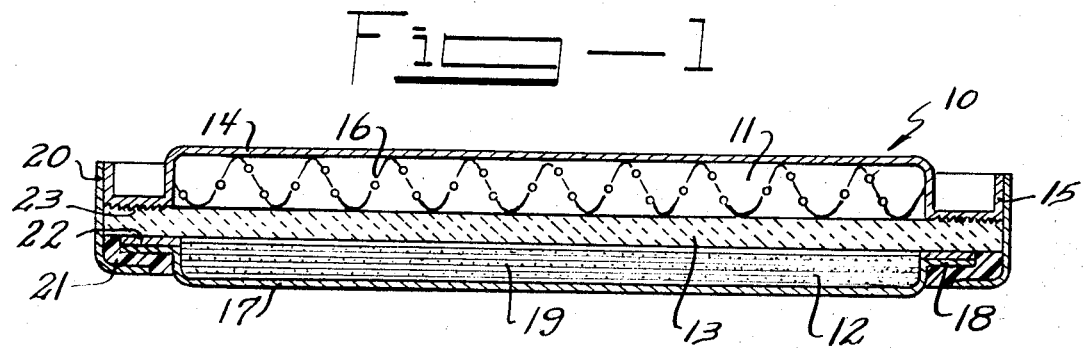
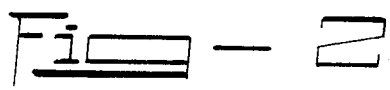
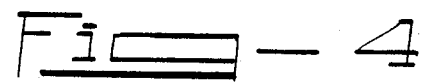
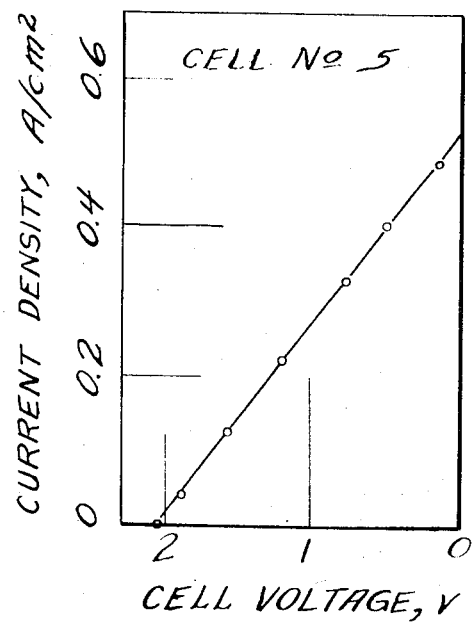
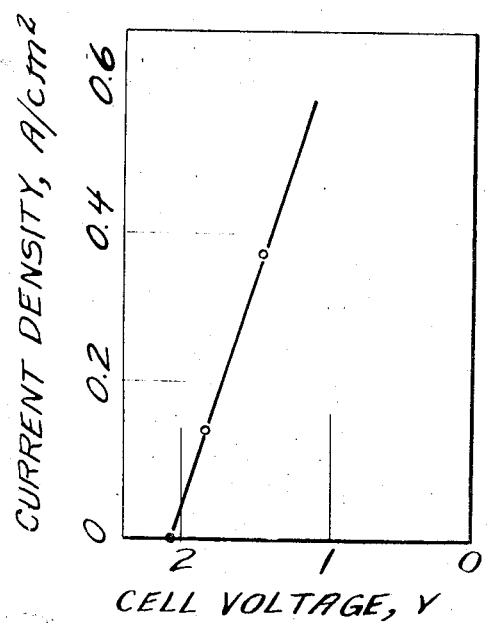

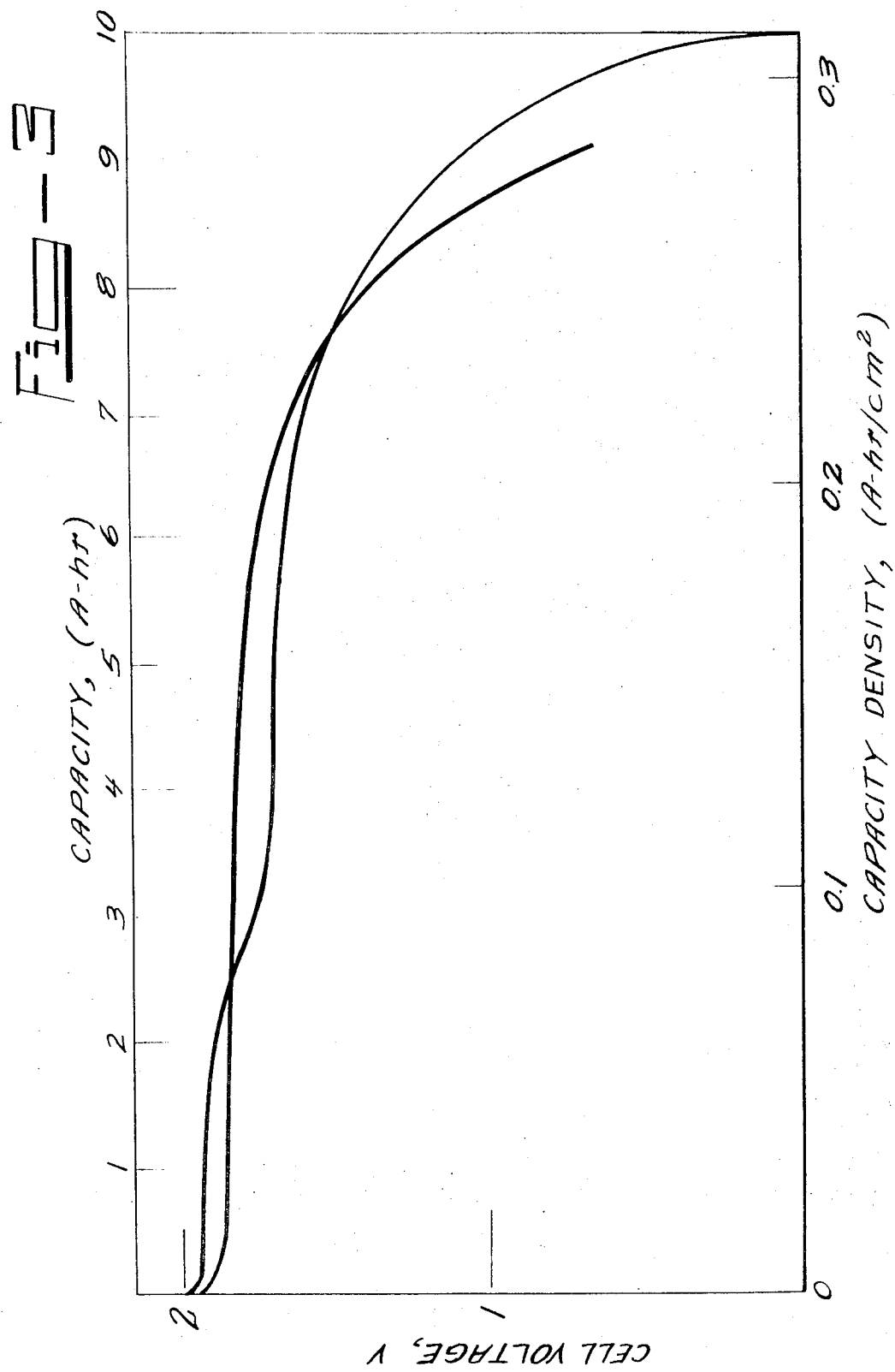

United States Patent Office 3,666,560
Patented May 30, 1972

3,666,560
ELECTROCHEMICAL POWER-PRODUCING CELL
Elton J. Cairns, Downers Grove, Albert A. Chilenskas, Western Springs, Robert K. Steunenberg, Naperville, and Hiroshi Shimotake, Hinsdale, Ill., assignors to the United States of America as represented by the United States Atomic Energy Commission
Filed Sept. 21, 1970, Ser. No. 73,830
Int. Cl. H01m 35/02
U.S. Cl. 136—6                         4 Claims

ABSTRACT OF THE DISCLOSURE

An electrochemical power-producing cell including a molten lithium metal anode, a molten selenium metal cathode, a paste electrolyte separating the anode from the cathode, an anode current collector and a single layer of niobium expanded metal formed in corrugated shape as cathode current collector. In addition means are provided for sealing the anode and the cathode from loss of lithium and selenium respectively and an insulator is provided between the anode housing and the paste electrolyte disk.

CONTRACTUAL ORIGIN OF THE INVENTION

The invention described herein was made in the course of, or under, a contract with the United States Atomic Energy Commission.

BACKGROUND OF THE INVENTION

This invention relates to an electrochemical power-producing cell and in more detail to a lithium-selenium secondary cell of high specific energy.

In our technologically oriented society, there is an increasing need for compact, convenient, polution-free electrical power sources and energy-storage devices. A large number of power-source needs, both civilian and military, have gone unfulfilled because of the limited capabilities of presently available batteries and engine-generators. In an attempt to satisfy these needs, a great deal of effort has been expended over the last decade in the areas of energy conversion and energy storage. A large portion of the effort has involved electrochemical devices such as fuel cells, metal/air cells, secondary (electrically rechargeable) cells with both aqueous and nonaqueous electrolytes and thermally regenerative cells.

Although a wide variety of electrochemical cells is available, none in existence can be used for applications requiring a high specific energy (watt-hour per kilogram) and a long cycle life (number of charge-discharge cycles before failure). One such application is as an implantable battery serving as the power source for an artificial heart, the battery being recharged by electromagnetic waves transmitted through the skin. Such a battery must be operated in an environment which is at the temperature of the body (37° C.) and many batteries suffer a significant decrease in charge/discharge energy efficiency at such a temperature. The present battery was developed in the course of a search for such a battery and, while not presently satisfactory for such a purpose primarily due to short operating life and inadequate cycle life, can be used in other applications not requiring such a long cell life or frequent recycyling. Hopefully, a further development program now under way will make this battery suitable for the purpose originally intended.

Totally implantable artificial hearts or heart assist devices are rather complex energy-conversion devices including a flexible-wall diaphragm pump to drive the blood and a second pump to move fluid which operates the first pump. It is to the energy source of this second pump that the research work leading to development of the present pump was directed.

SUMMARY OF THE PRESENT INVENTION

According to the present invention a corrugated cathode current collector is employed in an electrochemical power-producing cell containing a selenium cathode, a lithium anode and a paste electrolyte disk separating the two. In addition a ceramic or glass vacuum-tight seal and a boron nitride insulator are provided between the anode housing and the paste electrolyte disk, and grooves are employed in the cathode housing to obtain a vapor-tight seal with the paste electrolyte disk.

BRIEF DESCRIPTION OF THE DRAWING

FIG. 1 is a cross-section of a secondary power-producing cell constructed according to the present invention;
FIG. 2 is a graph showing voltage vs. current density for a cell similar to that disclosed in FIG. 1, except that the cathode current collector was not corrugated;
FIG. 3 is a graph showing voltage vs. capacity density for this cell;
FIG. 4 is a graph showing voltage vs. current density for a similar cell which did include corrugated cathode current collector.

SPECIFIC EMBODIMENT OF THE INVENTION

Figure 5:
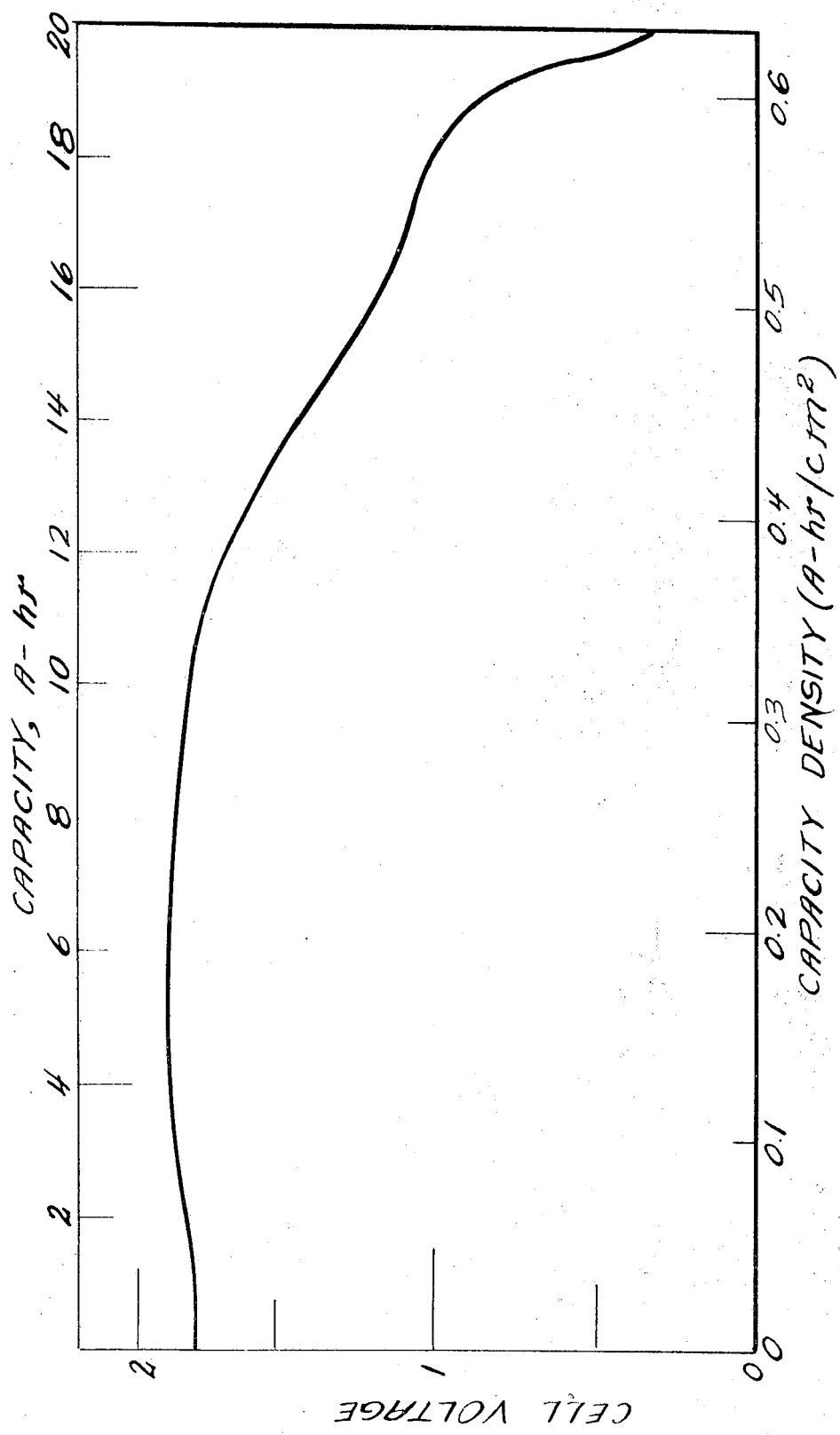
FIG. 5 is a graph showing voltage vs. capacity density for this cell.

Referring first to FIG. 1 of the drawing, secondary cell 10 includes a cathode 11 and an anode 12 separated by a paste electrolyte disk 13. The housing for the cathode consists of a niobium cathode cup 14 having a peripheral L-shaped flange 15. Enclosed in cathode cup 14 is the required amount of selenium and an expanded metal mesh niobium current collector 16 having a corrugated shape. The housing for the anode consists of a Kovar anode cup 17 having a peripheral flange 18. Kovar is a trademarked material containing approximately 53.7 wt. percent iron, 29.0 wt. percent nickel, 17 wt. percent cobalt, and 0.3 wt. percent manganese which is used because of an excellent match in thermal expansion coefficients with many glass and ceramic materials. Niobium may also be used. Enclosed in anode cup 17 is a current collector 19 consisting of one or more porous metal sheets and the required amount of lithium. An L-shaped Kovar (or niobium) ring 20 extending around the cell is welded to flange 15 and sealed from the interior of anode cup 17 by a glass or other ceramic material seal 21 disposed within the angle of the L-shaped ring 20. Vacuum tight seal 21 joins Kovar anode cup 17 to Kovar peripheral ring 20 to form an electrically insulated subassembly. Flange 18 is insulated from disk 13 by a 1 mm. thick boron nitride ring 22 and flange 15 contains grooves 23 in the portion adjacent to disk 13 to ensure a positive seal therewith. The usual electrical leads (not shown) are provided.

A continuing series of experiments has been conducted in an attempt to determine the parameters of a power-producing cell from which could be constructed an implantable battery which would deliver adequate power for the purpose intended while being of minimum size and weight and which would require recharging at reasonably long intervals. As a result of preliminary design calculations, a cell having a 7.5 cm. diameter paste electrolyte about 0.3 cm. thick with an active area of 31.6 cm.$^2$ was chosen. Each of 5 cells in the battery must store 24 w.-hr.; therefore, the energy density must be 0.76 w.-hr./cm.$^2$ and the capacity density must be about 0.45 a.-hr./cm.$^2$ (for an average cell voltage of 1.7 v.). If all the selenium could be converted to $Li_2Se$ during discharge then 0.66 gram Se/cm.$^2$ or 21 grams selenium per cell would be required. In the tests conducted under this program, the amount of selenium (99.99% purity) placed in the cell varied from 23 to 61 grams. Correspondingly, 3.68 grams of lithium (99.97% pure) are required in each cell. 4 to 8 grams were usually placed in the cells.

Requirements for the paste electrolyte disk include adequate mechanical strength, uniform thickness, absence of mechanical stresses and interconnecting pores and cracks, oxide free surfaces, good wettability by the anode and cathode materials and a reasonably high percentage of theoretical density. In all of the experiments the paste electrolyte disk was formed of a mixture of lithium aluminate ($LiAlO_2$) powder and the eutectic of lithium fluoride, lithium chloride and lithium iodide. Briefly, the procedure consisted of preparing the LiF-LiCl-LiI eutectic (11.7 mole percent LiF, 29.1 mole percent LiCl and 59.2 mole percent LiI) from previously dried constituents. The molten eutectic was contacted with molten lithium to remove final traces of moisture and was then solidified and crushed to a fine powder (<100 mesh). The electrolyte powder was mixed with lithium aluminate powder to produce a mixture which was for most of the experiments described here 60 wt. percent electrolyte and 40 wt. percent $LiAlO_2$. In general the proportion of electrolyte may vary between 40 and 60 wt. percent and that of $LiAlO_2$ between 60 and 40 wt. percent. This ratio of constituents produces the optimum combination of strength and conductance. The mixture was heated for several hours at 400° C. in order to coat the $LiAlO_2$ filler with the electrolyte. This fused mass was ground to a fine powder and heated again. The heating and grinding procedure was carried out three times. The resulting molding powder was used for vacuum hot-pressing of 7.5 cm. paste electrolyte disks. Typical pressing conditions were 1200 kg./cm.$^2$ pressure at 200° C. for 1 hour, with evacuation to 0.02 torr. The resultant disks weighed about 40 grams and had a density of about 3 grams/cm.$^3$ (about 90% of the theoretical density). Examination of unused paste electrolyte disks showed that they were porous allowing helium penetration at a rate of about 100 cm.$^3$ STP (min.-atm.-cm.$^2$). Coating of the paste electrolytes with additional salt reduces this rate to a negligible value. The salt used may be the electrolyte salt or a similar salt.

A voltage vs. current density curve for cell No. 5 (the fifth cell constructed in this continuing experimentation) is shown in FIG. 2 and voltage vs. capacity density curves for cells 5 and 6 are shown in FIG. 3. These cells were operated in the horizontal position with the selenium cathode uppermost. The cathode contained 30.1 grams of selenium and the cathode current collector consisted of nine stacked layers of niobium expanded mesh of 82% porosity and 0.23 cm. die size rather than the cathode current collector shown in the drawing. The anode contained a type 430 stainless steel Feltmetal current collector (87% porosity, 200 μm. pore size) soaked with 8.5 grams of lithium. (Feltmetal is a trademarked material, which is prepared by squeezing metal fibers into a mass and sintering the mass, the use of which is not critical to the present invention.) The electrolyte disk had not been coated. An additional difference from the construction shown in the drawing is that a glass seal was not employed.

The open-circuit voltage was 2.12 v. and the short circuit current density was about 0.5 a./cm.$^2$ The capacity densities were over 0.3 a.-hr./cm.$^2$, which was greater than those that had been obtained with previous cells. However, this capacity density is still not high enough for the purpose intended.

Cell No. 7 was operated in the vertical orientation with a corrugated current collector such as is shown in the drawing. This cell was assembled with a paste electrolyte disk which had been coated with LiCl-LiI-KI eutectic salt (M.P. 260.5° C.) and was impermeable to helium gas. Coating of the paste electrolyte disk prevents selenium from permeating the disk which would result in self discharge of the cell. The node contained a Type 430 stainless steel Feltmetal (87% porosity, 200 μm. pore size) current collector which was soaked with 8.5 grams of lithium. The cathode current collector (98% porosity) was a single layer of niobium expanded-metal mesh (0.23 cm. die size and 0.0127 cm. thick) that had been formed into a corrugated shape (about 10 corrugations). The cathode cup was charged with 62.5 grams of selenium. As shown in FIG. 5, the capacity density of the cell was about 0.5 a.-hr./cm.$^2$—approximately double (depending on the cut-off voltage selected) the capacity density attained heretofore. The performance of cell No. 7 was higher than that necessary to meet the power density and capacity density requirements for the battery under development. For this reason all subsequent tests have been carried out using a corrugated current collector.

It is believed that the significant increase in capacity density resulted from the use of an impervious paste electrolyte and of a corrugated current collector. Use of the corrugated current collector resulted in better contact between the surface of the cathode current collector and the paste disk, and better convection in the bulk cathode material, the latter occurring because of the corrugation extending vertically the length of the current collector.

To achieve a positive seal between cathode cup 14 and electrolyte disk 13, grooves 23 are provided in flange 15 of cathode cup 14 and the paste disk is pressed into the grooves when the paste disk is at a temperature above the melting point of the electrolyte. It should be noted that at the operating temperature of the cell, the salt component of the paste is above its melting point. The composite, however, behaves as a rigid body, that is, essentially as a solid. For best results a total of 10 or more 0.15 mm. deep grooves having sharp edges can be employed. Experiments have shown that by this expedient, selenium can be sealed within the cathode cup.

Boron nitride ring 22 serves as electrical insulator between paste disk 13 and anode cup 17. Experiments have demonstrated that the cell can be recharged smoothly without short circuiting when a suitable material such as boron nitride is used as the electrical insulator. Other materials for the purpose are beryllium oxide, aluminum nitride, or alternating layers of metal and bonded refractory metal oxide such as thoria bonded to stainless steel.

Lastly, glass or a ceramic material is preferred as the material of construction of seal 21.

It will be noted that the cathode and the peripheral ring are operated at the same potential according to this embodiment. This has the advantage over an arrangement is which the anode and the peripheral ring are operated at the same potential of minimizing the possibility of lithium deposition on the ring during recharge of the cell and possible short circuiting of the cell.

A plurality of the cells described above are included in a battery which will provide a useful amount of power. This battery may be insulated by layers of multifoil vacuum insulation—such as aluminized polyamide—which will maintain the battery temperature with a heat loss near the heat generation rate under normal operating conditions (1 to 2 watts). The heat loss through the insulation is expected to be about 0.1 watt; the remaining losses being through the electrical leads and joints in the insulation, totaling about 2 watts.

The embodiments of the invention in which an exclusive property or privilege is claimed are defined as follows:

1. In an electrochemical power-producing cell comprising a molten lithium metal anode in contact with an anode current collector, a molten selenium metal cathode disposed within a cathode cup and in contact with a cathode current collector within said cathode cup and a fused salt electrolyte containing a finely divided inert ceramic filler in the form of a paste disk separating said anode and cathode, the improvement wherein said cathode current collector comprises a single layer of expanded metal formed in a corrugated shape with said molten selenium metal contacting both surfaces of the corrugated metal layer and the interior of said cathode cup defining the perimeter of the current collector, said corrugated current collector being coextensive with and having its corrugation ridges on one side in contact with said electrolyte paste disk.

2. The improvement of claim 1 wherein the paste disk is formed of a mixture of 40–60 wt. percent lithium aluminate and 60–40 wt. percent of the eutectic of lithium fluoride, lithium chloride and lithium iodide, said paste disk being coated with a salt mixture containing ions of the anode metal to make it impermeable.

3. An electrochemical power-producing cell comprising a molten lithium metal anode disposed in an anode cup having a peripheral flange extending therearound, there being an anode current collector in said anode cup in contact with the molten lithium metal; a molten selenium metal cathode disposed in a cathode cup having a peripheral L-shaped flange extending therearound, there being a single layer expanded metal niobium current collector having a corrugated shape in said cathode cup, the interior of said cathode cup defining the perimeter of said current collector, with both surfaces of said corrugated current collector in contact with the molten selenium metal; a fused salt electrolyte containing a finely divided inert ceramic filler in the form of a paste disk separating the anode from the cathode, said corrugated-shaped niobium current collector being coextensive with and having its corrugation ridges on one side in contact with the electrolyte paste disk; an insulator ring comprising thoria bonded to stainless steel, boron nitride, beryllium oxide or aluminum nitride located between said electrolyte paste disk and said anode cup flange; an L-shaped metal ring welded to the cathode cup flange and surrounding the cell; and a glass or ceramic seal disposed between said L-shaped metal ring surrounding the cell and said anode cup so as to prevent the loss of lithium therefrom and electrically insulate said L-shaped ring from the anode cup.

4. An electrochemical power-producing cell according to claim 3 which includes sharp-edged grooves in the portion of the cathode flange adjacent the paste disk whereby said disk can be pressed into said grooves when hot to assure a positive seal against leakage of the selenium.

References Cited

UNITED STATES PATENTS

| | | | |
|---|---|---|---|
| 3,488,221 | 1/1970 | Shimotake et al. | 136—6 |
| 3,496,018 | 2/1970 | Hamlen et al. | 136—6 |
| 3,531,324 | 9/1970 | Fischer et al. | 136—6 |
| 3,468,709 | 9/1969 | Kummer | 136—6 |
| 3,177,096 | 4/1965 | Jache | 136—6 |

WINSTON A. DOUGLAS, Primary Examiner

C. F. LE FEVOUR, Assistant Examiner

U.S. Cl. X.R.

136—20